United States Patent [19]
Zakaras

[11] 3,781,927
[45] Jan. 1, 1974

[54] MOTOR OPERATED BED HAVING LOW LEAKAGE CURRENT

[75] Inventor: Anthony E. Zakaras, Palos Park, Ill.
[73] Assignee: Simmons Company, New York, N.Y.
[22] Filed: Aug. 9, 1972
[21] Appl. No.: 279,095

[52] U.S. Cl.................................. 5/67, 5/60, 5/92, 128/419, 307/92
[51] Int. Cl........ A61g 7/10, H02h 9/00, A61n 1/36
[58] Field of Search............................ 5/63, 66–69, 5/92; 318/228, 229; 317/17, 92, 93; 307/17, 92; 128/419, 422; 297/330

[56] References Cited
UNITED STATES PATENTS
3,005,999  10/1961  Brown....................................... 5/67
3,633,225  1/1972   Burst......................................... 5/63
3,573,551  6/1969   Sircom.................................. 307/92

*Primary Examiner*—Casmir A. Nunberg
*Attorney*—William E. Anderson et al.

[57] ABSTRACT

A motor operated adjustable hospital bed having a mattress supporting frame pivotally mounted on a lower supporting frame. The mattress supporting frame is pivoted with respect to the lower supporting frame by an actuating means which is driven by an electric motor mounted on the lower supporting frame. An on/off electrical control controls the electrical power supplied to the motor. A power supply means supplies power to the electrical control which power supply means includes a transformer having isolated primary and secondary insulated windings, the electrostatic coupling between the primary and secondary windings being less than 241 picofarads. Supplementary electrical insulation is disposed on the transformer and the electrically insulated transformer is mounted on the lower supporting frame. The primary winding of the transformer is connected to a source of alternating current power and the secondary winding is connected to the electrical control.

10 Claims, 1 Drawing Figure

PATENTED JAN 1 1974
3,781,927
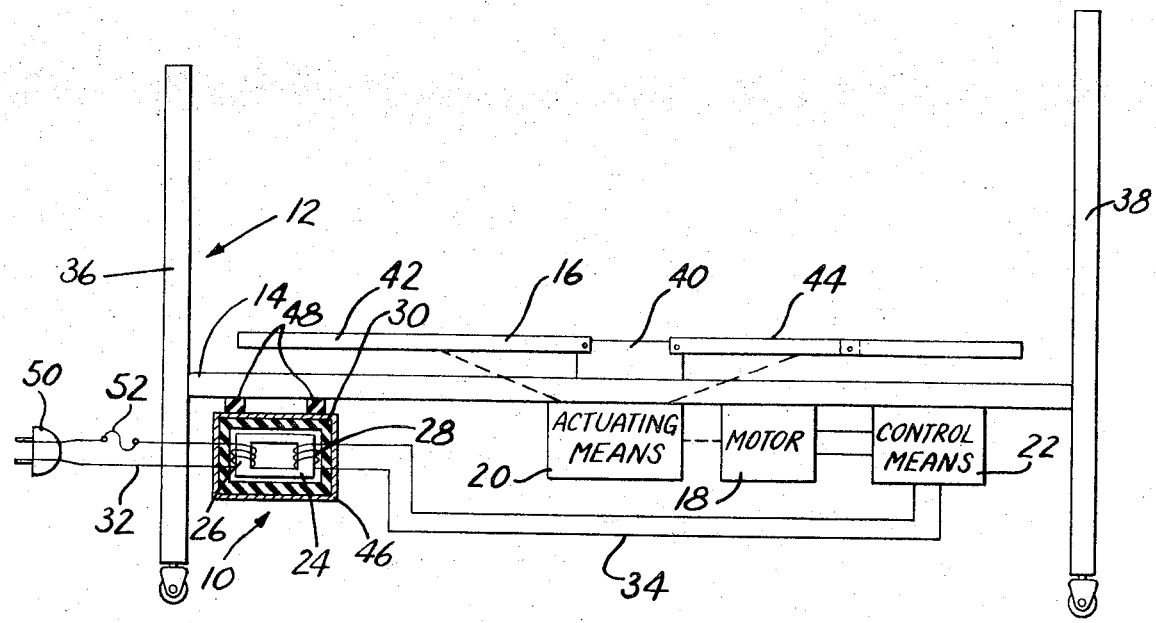

MOTOR OPERATED BED HAVING LOW LEAKAGE CURRENT

This invention relates generally to a motor operated, adjustable bed, and more particularly, to such a bed which includes a power supply which minimizes leakage currents.

Electric shock from low voltage (120–240 volts) has been classified into two modes, commonly called macroshock and microshock. Macroshock is electric shock due to contact applied to the exterior of the body and is the shock to which persons are always exposed in the home, in industry, and in the hospital. Macroshock results from one's body becoming part of an electrical circuit. In such situations, currents in the range of 100 to 300 milliamperes can cause heart fibrillation. The electrical hazard due to macroshock is normally reduced by proper insulation of the current carrying conductors and then providing an enclosure or barrier for the insulated conductor. In addition, all metal parts which may come in contact with the conductors if the insulation becomes defective are normally grounded.

While in the home or in industry microshock is not normally a hazard, in a hospital microshock may be a much more serious hazard than macroshock when a lead or electrical conductor from the interior of the heart is extending out through the body's surface (e.g., a transvenous catheter or external pacemaker). It has been suggested that currents in the range of 20 microamperes, which currents are found as leakage in most electrical appliances, can cause ventricular fibrillation in humans when passed directly through the heart. Such a fatal current may pass through the heart if, for example, a patient's motor operated bed with an improper ground connection (which could be due to a faulty ground in the hospital wiring or to an interrupted ground circuit in the patient's bed), containing leakage currents of sufficient intensity, comes into contact with the pacemaker leads and if the patient is in contact with an EKG machine or any other grounded object. Another example, would be if the pacemaker leads pick up leakage current from some other appliance other than the bed while the bed's ground is intact and the patient touches the metal frame of his bed he may also receive a fatal microshock.

Leakage current in the patient's motor operated bed with an improper ground connection are present because of the electrostatic coupling or stray capacity which exists across insulation between current carrying conductors in motors, controls, etc. and the metal frame of the bed on which the motors, controls etc. are mounted. Normally, the largest part of the leakage current is contributed by the electrostatic coupling between the primary winding of the motor and the metal frame.

Much has been said and written about precautions that may be taken to minimize microshock hazards in the design, operation and maintainence of electrical appliances used in caring for caring for cardiac patients. Underwriters Laboratories has proposed that appliances intended for use in electrically sensitive patient locations should limit leakage current to less than 10 microamperes under even the most adverse conditions including reverse polarity with ground and/or neutral lines interrupted.

Attempts have been made to obtain a level of less than 10 microamperes by reducing the electrostatic coupling between the electrical parts, especially the motor, and the metal frame of the bed. In one application, this has been done by double insulating the motor operated bed, viz., the metal cases of all electrical parts including the motor, the gear box and the control unit for the motor are encompassed, and thus insulated, from the metal of the bed by a supplementary barrier of high dielectric strength material. However, in such double insulated structures, the motion of the gears and motor cause wear and require eventual replacement. Such replacement requires extensive knowledge. Also, because the beds are double insulated over extensive areas, it is not easy to modify old beds to meet low leakage levels.

When double insulation is employed, such as described above, Underwriter Laboratories is requiring that current leakage be less than 30 microamperes when functional insulation or supplementary insulation becomes defective. The above-described double insulated bed does not meet this requirement.

Isolation power transformers have been suggested but it has been previously assumed that they would not provide a satisfactory solution. The isolation transformers that have been suggested were designed with a sufficient voltage-ampere rating to continuously supply current to the motor of the bed. Such an isolation transformer would have been expensive and would not have reduced the leakage current below the acceptable level.

An object of the present invention is to provide a motor operated adjustable bed having an improved power supply means which reduces the leakage current to an acceptable level. Another object of the invention is to provide an improved power supply for a motor operated adjustable hospital bed which power supply reduces the current leakage level below 10 microamperes.

Other objects and advantages of the present invention will become apparent by reference to the description and accompanying drawings in which the single FIGURE is a schematic circuit diagram of the improved power supply in a motor operated adjustable hospital bed.

Briefly, in accordance with the present invention a power supply 10 is provided for a motor operated, adjustable hospital bed 12 which bed includes a lower supporting frame 14 and a mattress supporting frame 16 pivotally mounted to the lower supporting frame 14. An electric motor 18 is mounted on the lower supporting frame 16 and is connected by means of an actuating means 20 to the mattress supporting frame 16 so that when electric power is supplied to the motor 18 the actuating means 20 moves the mattress supporting frame with respect to the lower supporting frame. The electrical power is supplied to the motor through an on/off electrical control means 22 mounted on the lower supporting frame 14. The power supply means 10 includes a transformer 24 having a primary winding 26 and a secondary winding 28 which secondary winding 28 is isolated from the primary winding 26 so that the windings while being magnetically coupled do not introduce either significant conductive or significant electrostatic coupling. Preferably, the electrostatic coupling is made less than about 241 picofarads. The transformer 24 is mounted to the lower supporting frame 14 by means of a supplementary barrier 30 of electrical insulation so that the transformer is insulated from the frame. The primary winding 26 of the transformer 24 is connected by a first pair of conductors 32 to a source of a.c. power (not shown) and the secondary winding 28 is connected by a second pair of conductors 34 to the electrical control 32.

More particularly, the motor operated adjustable hospital bed 12 shown in the drawings, except for the improved power supply, may be a conventional hospital bed such as that disclosed in U.S. Pat. No. 3,081,463. The bed includes the lower supporting frame 14 which is made of metal and is attached at one end to a metal head assembly 36 and at the other end to a metal foot end assembly 38. A metal seat section assembly 40 is fixedly mounted on the lower supporting frame 14 intermediate its ends.

The mattress supporting section 16 includes a metal head section assembly 42 pivotally mounted at one end to the seat assembly 40 and a metal articulated leg section assembly 44 pivotally mounted at one end to the seat section assembly 40. The articulated leg section assembly 44 and the head section assembly are adjusted to various positions by means of the electric motor 18 which is connected to the leg section assembly 44 and to the head section assembly 42 by means of the actuating means 20.

The electrical motor is mounted on the lower supporting frame 14 and should be of sufficient size to raise and lower a 300 pound patient load. Normally, such motors are reversible, two phase induction motors which draw about 3.5 amps. Power is supplied to the motor through the control box or means 22 which includes on/off switches (not shown) and reversing switches (not shown) to cause the motor 18 to rotate in a forward direction or in a reverse direction under the control of the patient or other operator. Power is supplied to the control box 22 by the power supply means 10 through the pair of insulated conductors 34.

The power supply means 10 includes the transformer 24 which is of the isolation type and is doubly insulated. An isolation transformer is a transformer designed to provide magnetic coupling between a pair of isolated circuits without introducing significant coupling of any other kind between them, i.e., without introducing either significant conductive (ohmic) or significant electrostatic (capacitive) coupling. The disclosed transformer 24 is designed so it preferably has an electrostatic coupling between the primary and secondary windings of less than 241 picofarads. To provide such a low electrostatic coupling, an isolation transformer is provided which is designed for an intermittent duty cycle and is rated for continuous duty at about 50 percent of the load. For the motor which draws about 3.5 amps, a transformer is provided having a 200 watts continuous and 400-500 watts intermittent rating. The isolation transformer 24 used, moreover, does not include an electrostatic shield which is normally provided between the primary and secondary windings of a standard isolation transformer. The insulation used in the transformer is IEEE and/or NEMA Class A material and the impregnant of the transformer is IEEE and/or NEMA Class F. Preferably, the transformer 24 is provided with an automatic thermal protector (not shown) so that the primary is opened if the windings of the transformer reach a temperature of 110° centigrade plus or minus 10 percent.

The transformer 24 is encased in a case 46 made for example of 20 gauge steel which is painted. Insulators or stand offs (not shown) are provided for supporting the transformer 24 within the case 46. Between the transformer 24 and the case 46, the supplementary insulation 30 is provided which is of suitable high dielectric material, for example, 0.020 inch thick 100 percent rag fish paper, encompassing the transformer. To reduce the electrostatic coupling between the windings of the transformer 24 and the lower supporting frame 14, the double insulated transformer 24 is mounted to the lower supporting frame 14 by additional insulators or stand offs 48.

The primary winding 26 of the transformer 24 is connected through the two conductor supply cord 32 to a wall plug 50. Because the transformer 24 is double insulated, a three wire conductor power cord is not required. However, a three conductor cord can be used if desired, in which case the ground wire is connected to the frame of the bed thereby grounding the same.

The transformer 24 is protected from over loads by a slow blow fuse 52. While the fuse 52 is shown connected in one of the conductors of the power cord 32 for purposes of illustration, the slow blow fuse is in practice disposed in a fuse holder (not shown) mounted inside the case 46 of the transformer 24.

The illustrated power supply 10 reduces the current leakage level of the bed below 10 microamperes. In a test made on a hospital bed including the double insulated transformer 10 and a two-conductor power cord 32, the leakage voltage between the frame and ground was measured at 0.00255 volts with the neutral wire open and with reverse or normal polarity of the power supply cord. This leakage voltage flowing across the standard 500 ohm resistor would produce a leakage current of 5.1 microamperes.

While in the disclosed motor operated bed, only one motor is employed, the power supply may also be used in a motor operated bed having a plurality of motors. For example, in certain beds, three motors are provided for actuating the various parts of the bed and the control box is arranged so that only one motor is operated at a time. In a test run on such a bed it was found that the leakage voltage between the frame and ground was 0.0034 volts. Across the 500 ohms standard resistor, such a leakage voltage would produce a leakage current of 6.8 microamps.

Of course, more than one motor may be operated at the same time if the rating of the transformer is not exceeded.

From the above, it can be seen that the power supply in accordance with the present invention provides a motor operated bed having a very low leakage current. Moreover, by double insulating the transformer rather than the motor, the insulating components have been minimized since they are all located in the transformer case area and its attachment to the lower supporting frame. All insulators are static and not subject to mechanical stress or wear due to motion. The power supply does not require extensive knowledge for repair or replacement of parts and is adaptable in new as well as old beds which customers may wish to update to meet low current range levels. Furthermore, macroshock is virtually reduced to only one very rare possibility in the secondary circuit and this possibility is if a person intentionally enters into the circuit between the two wires from the secondary winding of the transformer.

In the embodiment having an ungrounded bed frame, the hazard of shock or burn from electric current flowing through a body to any ground are mitigated against. There are no a.c. power ground loops because there is no circuit connection to earth or power supply ground.

Various changes and modifications may be made in the disclosed motor operated bed without deviating from the spirit or scope of the present invention. Various features of the invention are set forth in the accompanying claims.

What is claimed is:

1. In a motor operated, adjustable hospital bed having a lower supporting frame, a mattress supporting frame pivotally mounted on said supporting frame, actuating means for pivoting said mattress supporting frame, an electric motor mounted on said lower supporting frame for driving said actuating means when electric power is supplied to said motor, and an on/off electrical control mounted on said lower supporting frame for receiving electrical power and controlling the supply of that electrical power to said motor, the improvement which comprises a power supply means including a transformer having isolated primary and secondary insulated windings, the electrostatic coupling between said primary and secondary windings being less than about 241 picofarads, supplementary electrical insulation encompassing said transformer, means for mounting said electrically insulated transformer on said lower supporting frame, first means for electrically connecting said primary winding to a source of alternating current power and second means for electrically connecting said secondary winding to said electrical control and for supplying the electrical power to said electrical control.

2. An apparatus according to claim 1 wherein a metal case is disposed about the supplementary electrical insulation, and insulators are disposed between the case and the lower supporting frame.

3. An apparatus according to claim 1 wherein the first electrical connecting means is a two conductor power cord.

4. An apparatus according to claim 1 wherein the transformer is designed for intermittent duty with a rating of about 50 percent of the current draw of the motor.

5. An apparatus according to claim 2 wherein the transformer is designed for intermittent duty with a rating of about 50 percent of the current draw of the motor.

6. A power supply for a motor operated, adjustable hospital bed which bed includes a lower supporting frame, a mattress supporting frame pivotally mounted on said supporting frame, actuating means for moving said mattress supporting frame with respect to said lower supporting frame, an electric motor for driving said actuating means when electric power is supplied to said motor, and an on/off electrical control mounted on said supporting frame for receiving electrical power and controlling the supply of that electrical power to said motor, said power supply comprising a transformer having a primary insulated winding and a secondary insulated winding isolated from said primary winding, the primary and secondary windings being magnetically coupled without introducing either significant conductive or significant electrostatic coupling therebetween, the electrostatic coupling between said primary and secondary windings being less than about 241 picofarads, supplementary electrical insulation about said transformer, means for mounting said electrically insulated transformer on said lower supporting frame, first means for electrically connecting said primary winding to a source of a.c. power and second means for electrically connecting said secondary winding to said electrical control and for supplying the electrical power to said electrical control.

7. A power supply in accordance with claim 6 wherein a metal case is disposed about the supplementary insulation, and insulators are disposed between the case and the lower supporting frame.

8. An apparatus according to claim 6 wherein the first electrical connecting means is a two conductor power cord.

9. An apparatus according to claim 6 wherein the transformer is designed for intermittent duty with a rating of about 50 percent of the current draw of the motor.

10. An apparatus according to claim 7 wherein the transformer is designed for intermittent duty with a rating of about 50 percent of the current draw of the motor.

* * * * *